United States Patent
Kleinberg et al.

[19]

[11] Patent Number: 6,087,928
[45] Date of Patent: Jul. 11, 2000

[54] PREDICTIVE IMPACT SENSING SYSTEM FOR VEHICULAR SAFETY RESTRAINT SYSTEMS

[75] Inventors: Raymond Kleinberg, Sterling Heights, Mich.; Robert W. Diller, Pasadena, Calif.

[73] Assignee: Breed Automotive Technology, Inc., Lakeland, Fla.

[21] Appl. No.: 08/956,755

[22] Filed: Oct. 22, 1997

Related U.S. Application Data

[63] Continuation of application No. 08/816,469, Mar. 13, 1997, which is a continuation of application No. 08/550,695, Oct. 31, 1995.

[51] Int. Cl.[7] .................................................. B60Q 1/00
[52] U.S. Cl. .......................... 340/436; 340/435; 340/903; 340/904
[58] Field of Search ..................................... 340/903, 904, 340/435, 436

[56] References Cited

U.S. PATENT DOCUMENTS

| | | | |
|---|---|---|---|
| 5,039,217 | 8/1991 | Maekawa et al. | 340/904 |
| 5,210,521 | 5/1993 | Hojell et al. | 340/436 |
| 5,212,467 | 5/1993 | Park | 340/435 |
| 5,247,296 | 9/1993 | Spies | 340/435 |
| 5,249,157 | 9/1993 | Taylor | 340/435 |
| 5,285,188 | 2/1994 | Yoshida | 340/436 |
| 5,319,350 | 6/1994 | DeMarco et al. | 340/435 |
| 5,326,043 | 7/1994 | Yamanoi | 280/806 |
| 5,347,273 | 9/1994 | Katiraie | 340/435 |
| 5,355,118 | 10/1994 | Fukuhara | 340/436 |
| 5,410,304 | 4/1995 | Hahn et al. | 340/435 |
| 5,424,583 | 6/1995 | Spies et al. | 340/436 |
| 5,453,740 | 9/1995 | Gallagher et al. | 340/436 |
| 5,467,072 | 11/1995 | Michael | 340/903 |
| 5,936,549 | 10/1999 | Tsuchiya | 340/903 |
| 5,959,552 | 9/1999 | Cho | 340/903 |

*Primary Examiner*—Jeffery A. Hofsass
*Assistant Examiner*—John Tweel, Jr.
*Attorney, Agent, or Firm*—Markell Seitzman

[57] ABSTRACT

An improved safety restraint system for a motor vehicle including: safety restraint device such as a seat belt and air bag(s) for protecting an occupant during a crash, a processor for predicting the collision of an obstacle with the motor vehicle and for generating an output signal to activate various actuators, actuators for activating the restraint devices in dependence with an output of the sensors various sensors including a radar microwave or millimeter wave system for generating and propagating electromagnetic radiation waves and to receive reflected waves, the transmitted and received waves being of predetermined frequency, wavelength, spectrum, duration and power to provide a desired sensing range and response.

14 Claims, 4 Drawing Sheets

PREDICTIVE IMPACT SENSING SYSTEM FOR VEHICULAR SAFETY RESTRAINT SYSTEMS

This application is a continuation of application Ser. No. 08/816,469 filed Mar. 13, 1997, which is a continuation of application Ser. No. 08/550,695, filed Oct. 31, 1995.

BACKGROUND AND SUMMARY OF THE INVENTION

The present invention generally relates to a device and method for detecting an imminent vehicular collision and providing improved safety restraint system response. More specifically, the present invention relates to a complete safety restraint system which uses a low-cost, low power, short-range radar sensing system and other suitable auxiliary sensors in conjunction with an electronic safety control unit to improve activation of various safety components such as air bags and seat belts.

Various technologies have been proposed to allow the sensing of an obstacle in the path of a vehicle. These prior technologies include infrared, lasers, ultrasonic and other traditional forms of radar. These prior technologies have generally been designed to provide obstacle detection at ranges up to several hundred feet for collision warning systems, intelligent cruise-control applications and automatic braking systems.

The primary purpose of this invention is to provide an improved safety restraint system using a low-power, low-cost predictive input to a safety restraint control unit. The radar sensor would determine range and trajectory, and predict the impact location and time of impact of the obstacle with the vehicle, and provide this information to the safety system electronic control unit. Depending on the type of obstacle discrimination desired, an auxiliary sensor such as an infrared detector, is used to provide additional information on the obstacle. Once an obstacle has been detected within the range capability of the radar sensors, tracking software is activated, whereupon velocity and trajectory computations are performed. As will be evident in the description that follows, this information can be utilized to provide an earlier discrimination decision on the relative severity of the impending impact than is possible with the reactive crash detection sensor systems in common use today, as well as used to calibrate the crash severity sensing system with significantly greater immunity to undesired restraint activation that can occur during rough road and abuse situations.

A first embodiment of the invention consists of a low-power radar transmitter/receiver with appropriately designed antennae located at each corner of the vehicle as illustrated in FIG. 1. Each corner antenna is designed to provide a beam coverage angle of approximately 270 degrees, and to allow appropriate packaging within the styling requirements of the vehicle body. This may require mounting the antennae inside of, for example, a lamp housing to provide desired appearance. As shown in FIG. 2, the beam pattern overlap of this antenna configuration permits the entire circumference of the vehicle to be within the beam pattern of at least four (4) radar units. The radar units are pulsed at a sufficiently high rate and for a long enough duration to provide a reliable echo of the obstacle to be determined. Adjacent radar units can be powered at slightly different frequencies, or they can be activated alternately within the given pulse frequency/duration limits to reduce interference between the sensors and to assure that the reflected pulse received by a specific sensor was actually transmitted by that same sensor. Similarly, for an obstacle to be classified as nonspurious, it must be tracked by at least two of the sensors for more than one measurement cycle. The velocity of the obstacle can then be calculated by triangulation knowing the distance between the sensors, the measured pulse return time from each of the two sensors, and the difference in obstacle distance from one measurement to the next. Alternately, the velocity of the obstacle can be determined through Doppler shifting of the radar signal if suitable sensor electronics are deemed appropriate for the application. These computations of obstacle approach can be performed in the central electronic safety system control unit, or in a dedicated electronic control unit designed specifically for the radar signal analysis. Once the range and approach velocity of the obstacle are known, the trajectory and impact location of the obstacle are calculated by straight-line extrapolation or other suitable methods. Should certain pre-determined thresholds for obstacle impact velocity and impact location be met, then the radar electronic control unit provides an output signal, either incremental or continuously varying, to the safety restraint control unit. This signal is then used by the safety restraint control unit to modify the activation of various restraint components.

Another embodiment of this invention incorporates a secondary predictive sensing system, such as an infrared transmitter/receiver, with the primary (radar) predictive sensing system for the purpose of better obstacle identification or discrimination. In this embodiment, the primary obstacle locating and tracking system locates and tracks the obstacle as described above. Once it is determined that there is a high likelihood of an impact of an obstacle with the vehicle and that velocity and trajectory values are within pre-determined thresholds, the electronic control system signals the auxiliary sensor to obtain additional information about the obstacle. This additional information may be, but is not limited to, an infrared profile of the obstacle to determine the likelihood of the obstacle being human to, for example, determine if external safety devices carried on the vehicle should be activated to provide improved pedestrian protection.

It is the object of this invention to provide an improved safety restraint control system that includes a predictive impact radar sensing system including: a radar electronic control unit, a central safety restraint system control unit, optional auxiliary sensors to improve the discrimination ability of the primary predictive sensing system, frontal air bags, seat belt pretensions, side air bags and other restraint components.

Accordingly, this invention comprises: a system for determining the presence, range, velocity and trajectory of an obstacle with a high probability of imminent impact with a vehicle, an optional sensing sub-system to improve discrimination ability of the primary predictive sensing system, an electronic safety control unit which determines the activation of various safety restraint components based on data generated either internal to the unit or supplied externally by other devices, safety restraint means, such as a system including a three point safety belt system having a pretensioner with or without slack take-up means and load-limiting means and various air bags for protecting the occupant during a crash.

Other objects and purposes of the invention will be clear from the following detailed description of the drawings:

DETAILED DESCRIPTION OF THE DRAWINGS

Figure 1:
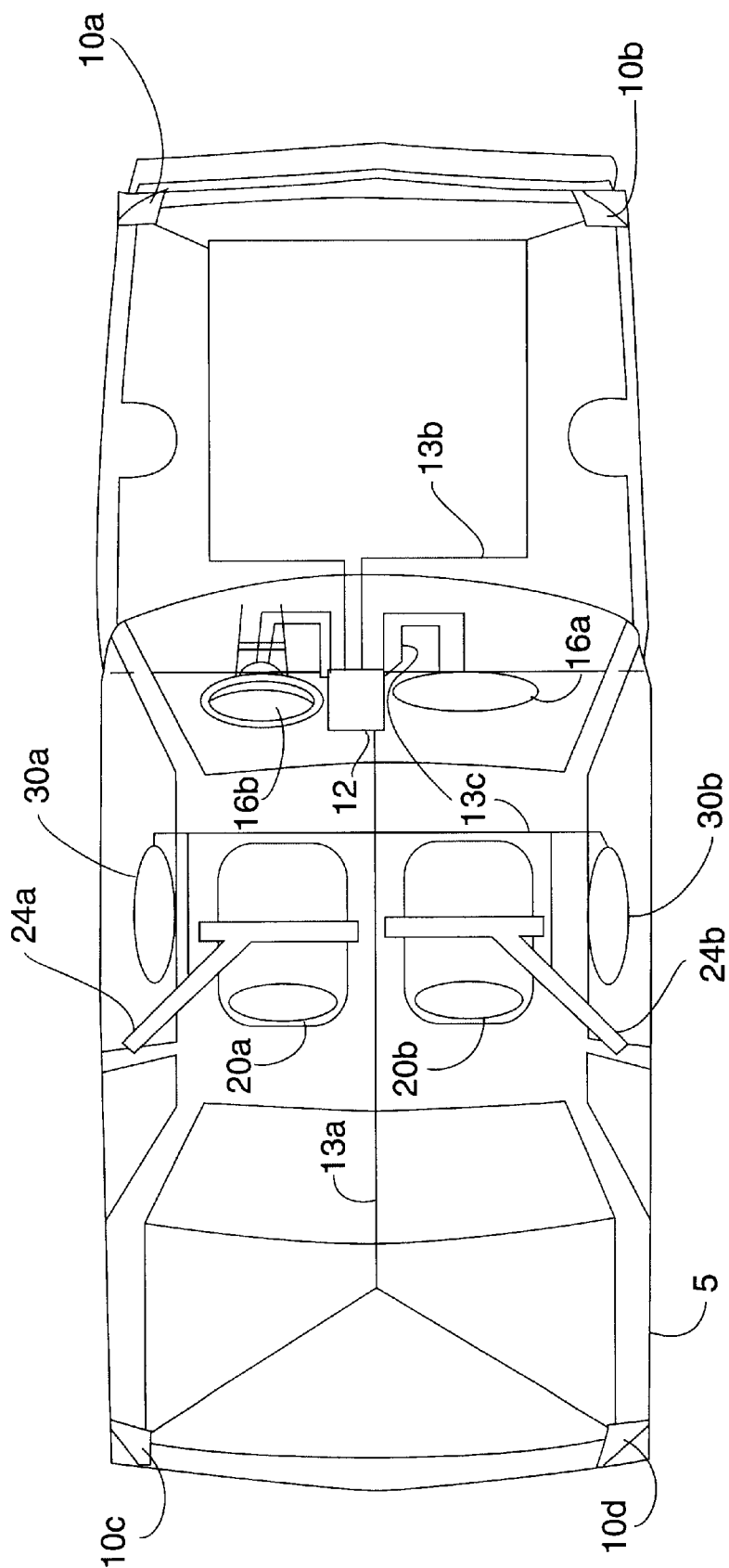
FIG. 1 shows a diagrammatic layout of the vehicle with many of the components described in the present invention.

Reference is now made to FIG. 1 which illustrates the major components of the present invention illustrating a top view of a typical passenger vehicle (5) having two front seats (20a, 20b). In this particular configuration, the electronic radar control unit and the electronic safety control unit are shown as a single integrated assembly (12). Radar sensors (10a, 10b, 10c, 10d) are shown at each corner of the vehicle, with an angular antenna orientation to provide the desired beam coverage. The radar sensors are connected to the electronic safety control unit through wiring harnesses (13a, 13b) which may be individual or multiplexed. The electronic safety control unit has wiring (13c) attached to the front air bags (16a, 16b), side air bags (30a, 30b) and the seat belt pretensioners (24a, 24b). It should be noted that only the two front radar sensors are required if only frontal obstacle detection is desired. In the present invention, the electronic radar control unit provides buffer and amplification circuitry for the various radar sensors, and processes the radar signal to derive relative position, velocity and acceleration between the vehicle and an obstacle. Additionally this unit generates one or more activation signals to the safety control unit to initiate the activation of various safety related devices such as driver and passenger air bags, side impact air bags and seat belt tightening devices including pre-tensions.

Figure 2:
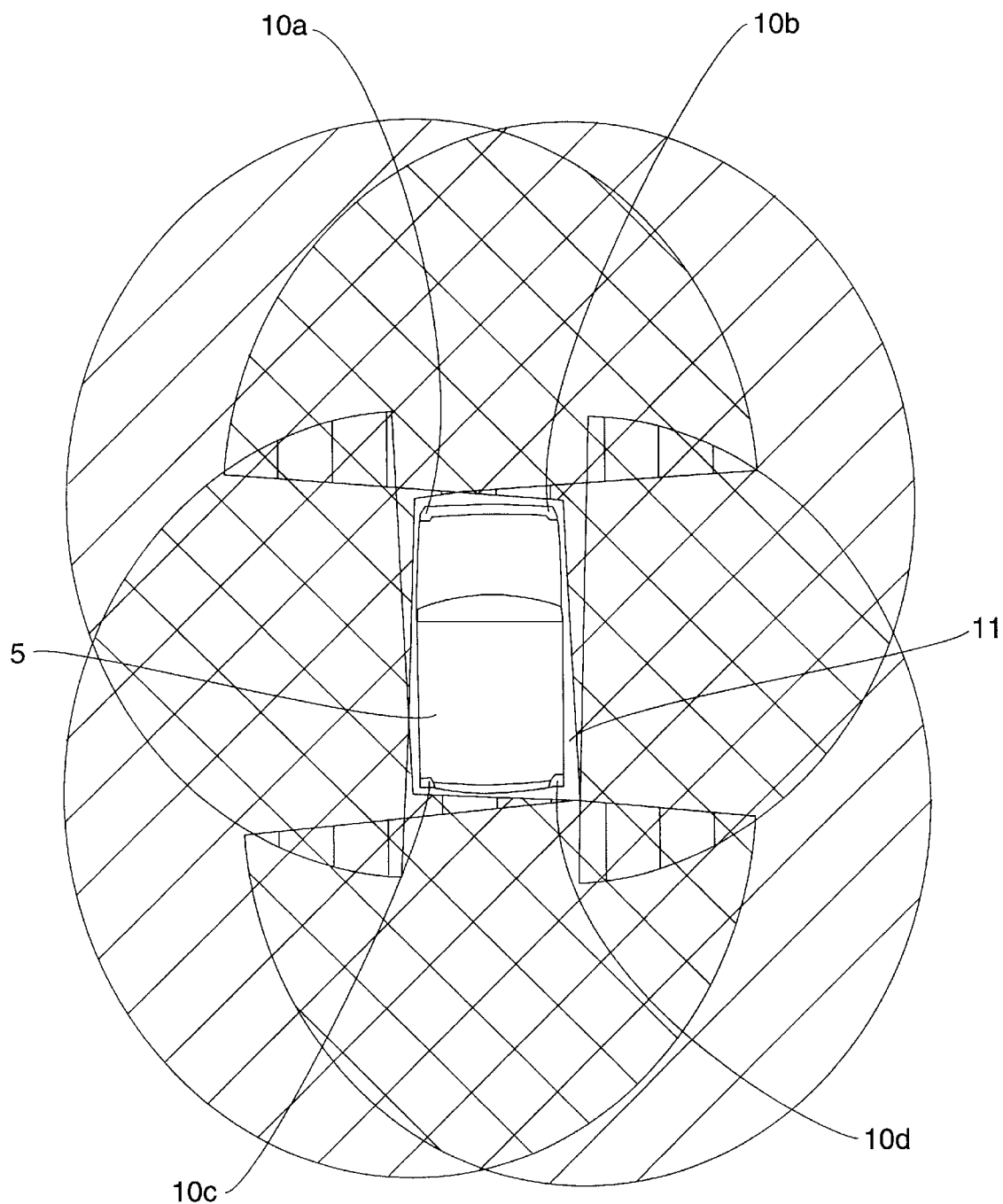
FIG. 2 shows the approximate beam coverage patterns of the radar sensors

Reference is made to FIG. 2, showing a top view of a similar passenger vehicle (5) with four corner radar sensors (10a–d). These radar sensors are preferably of a low power, preferably in the micro-watt level, having an antenna that produces an approximate beam coverage span of about 270 degrees shown by the shaded beam patterns provided by each antenna of each sensor. The power level of each radar sensor is sufficient to provide a nominal design distance for each radar beam of approximately 5 meters (16.25 feet), with a maximum sensing range of approximately 15 meters (48.75 feet), while the minimum distance to the vehicle where beam coverage can still be assured is approximately 0.5 meter (1.6 feet). This minimum sensing distance produces a boundary around the vehicle illustrated by the unshaped region (11). It can be seen that this type of antenna arrangement would allow obstacle sensing for the complete 360 degree circumference of the vehicle, and could provide information to the central safety control unit to detect the presence of impending frontal obstacles, as well as obstacles approaching from the sides (side-impact) and the rear (rear impact).

Figure 3:
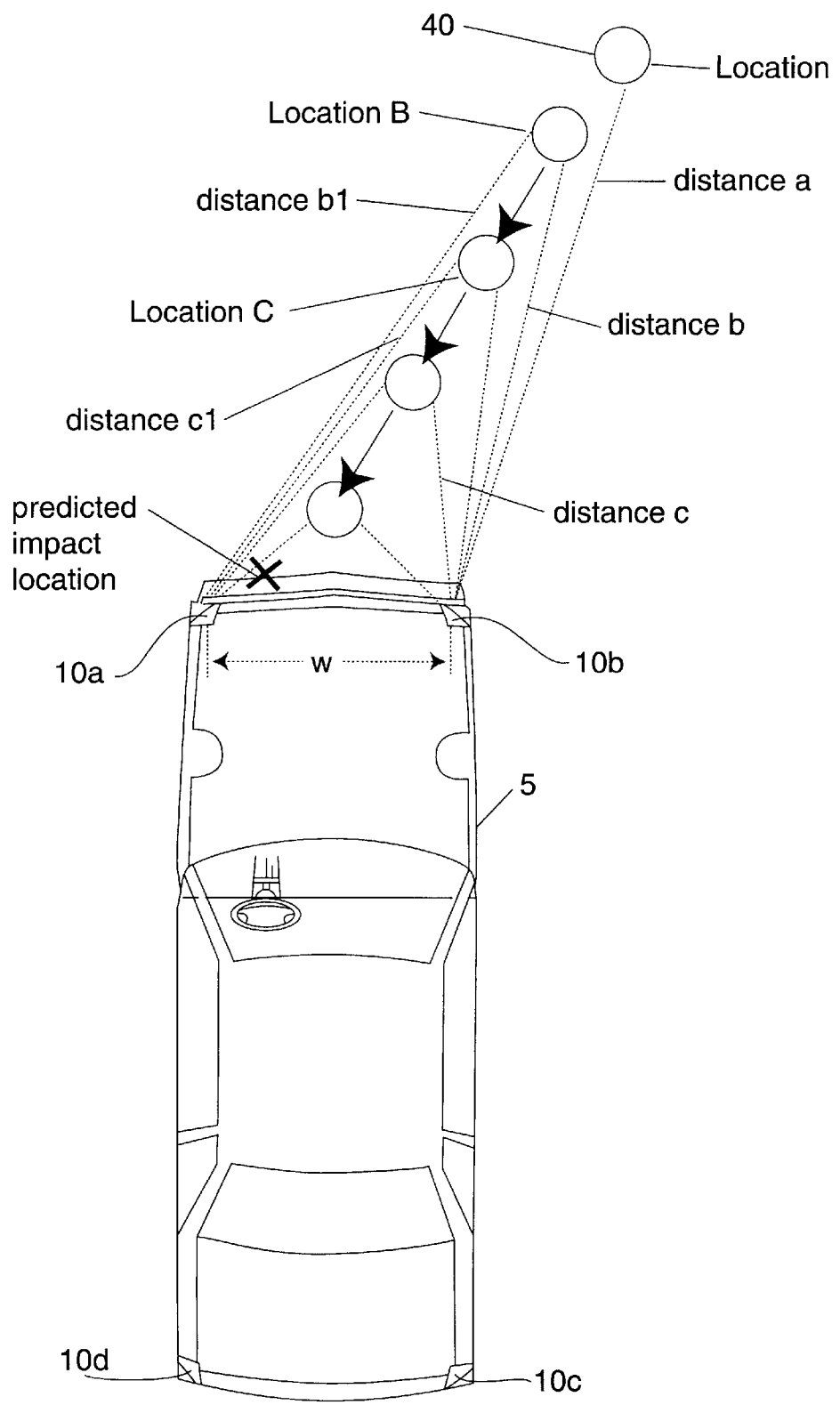
FIG. 3 illustrates the method used to track an obstacle

Reference is made to FIG. 3, which depicts a typical target locating and tracking method in relation to a passenger vehicle (5). An obstacle (40) enters the coverage area of one radar sensor (10b) at location A, and may not necessarily be in the field of reception of a second radar sensor (10a) or a third sensor 10c. The obstacle's presence at a distance a is obtained by sensing the echo of the transmitted radar signal generated by the first sensor (10b). This echo or rather a signal indicative of obstacle presence and distance are stored within the electronic control unit. During the next successive measurement interval the system determines if a second echo is received to eliminate spurious reflections. During this second measurement interval, the obstacle for example, is found to be at distance b from sensor 10b, where it is noticed not only by radar sensor 10b as a second echo return, but also by radar sensor 10a at a distance of b1. Since the obstacle is now registered or sensed by two sensors, a tracking algorithm within the radar control unit is activated and the first calculation of location is made. The tracking algorithm determines the location of the object, in relation to the vehicle using known navigation techniques such as determining the triangulated value based on the distance (w) between radar sensors 10b and 10a (which is known based on the mounting geometry of the sensors (w) and the distance value of the obstacle registered by each sensor which is derived from the received echo signal.

At this time, the velocity of the obstacle can be determined by known Doppler shifting circuitry and techniques, otherwise the velocity can be calculated using the obstacle's next location measurement where both an initial and a final distance and corresponding time interval are known, where the velocity is calculated as the change in distance per time interval relative to each sensor. During successive measurement intervals the radar control unit determines the object's distance c from sensor 10b and c1 from a sensor such as sensor 10a, which are then used to determine the location C. By storing the measured or calculated location and velocity of the object at successive measurement intervals, the change in velocity (acceleration) of the object can be determined as well as being able to predict the time of impact of the obstacle with the vehicle. Again using, for example, a triangulation technique, the point of impact with the vehicle can be predicted if needed. The number of data points that are available to calculate the above mentioned information before either an impact between the vehicle and obstacle occurs, or the obstacle misses the vehicle, is dependent on the obstacle's relative velocity. Even at relative velocity differentials exceeding 120 mph, the number of measurement intervals available between the maximum and minimum sensing range is still acceptable for tracking.

Figure 4:
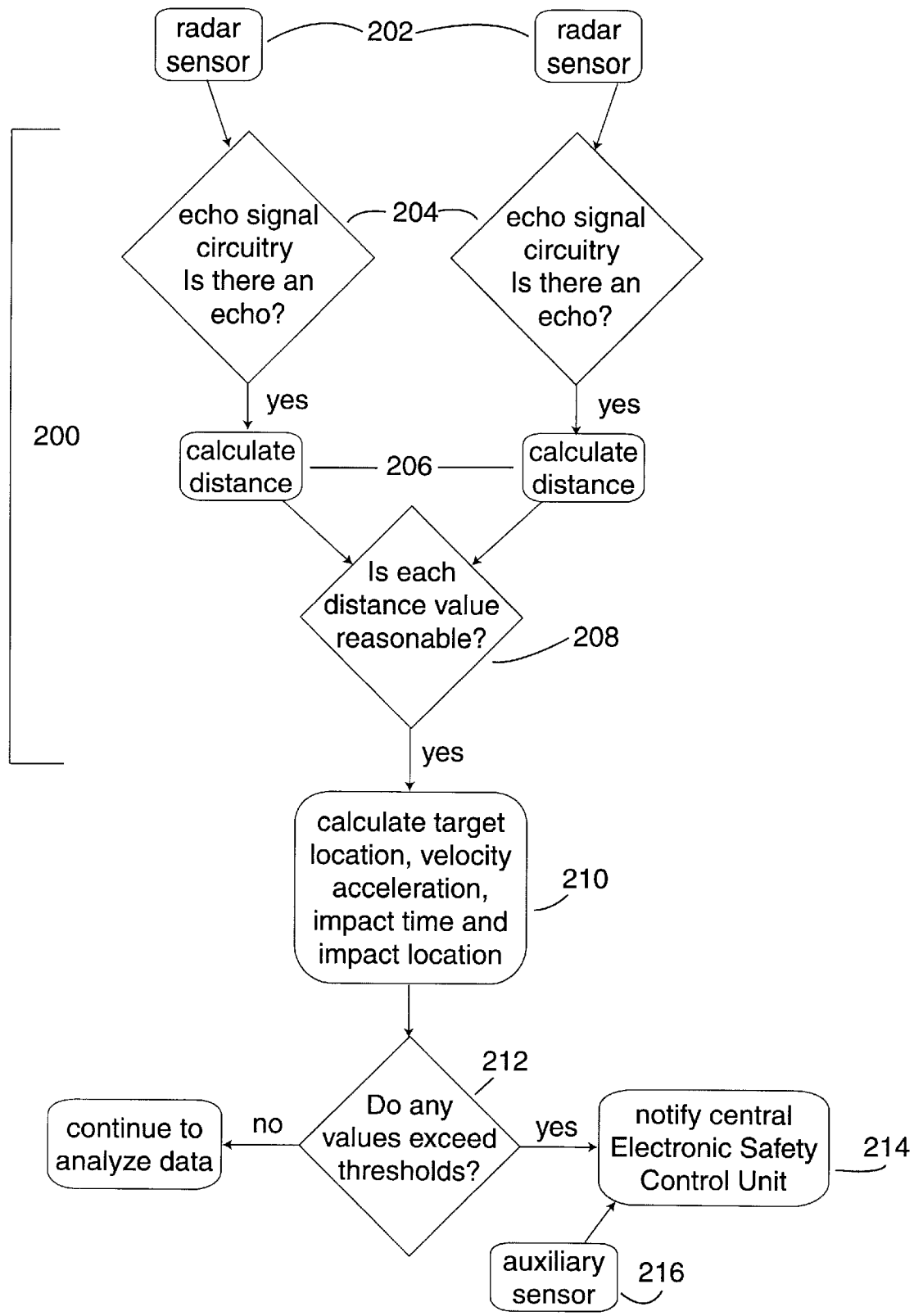
FIG. 4 illustrates the block diagram of the operation of the present invention

Reference is now made to FIG. 4 which illustrates the block diagram showing the operation of the radar control unit 200. In block 202, one or more radar sensors are triggered to generate a transmitted pulse. In block 204, the return signal or echo signal is sensed. If an echo is determined (block 206) the distance between the object and the vehicle is calculated. The distance measurements are evaluated by block 208 to determine if the information is reasonable. Block 210 takes the distance measurements to calculate object location, velocity, acceleration, impact time and impact location of the vehicle with the object (if any). As the block diagrams show, the control unit is designed to perform additional computation only when certain conditions from a previous decision block are met. This approach allows processing power to be shared with other components. The calculations mentioned above are then compared to predetermined threshold values in block 212. If threshold values are achieved, a signal is sent to the electronic safety control unit (block 214). At this time, the central safety control unit queries the optional auxiliary sensor (block 216) to obtain additional information on the obstacle. Alternately, the information generated in blocks 210–214 could be continuously sent to the central safety control unit for continuous evaluation.

What is claimed is:

1. An improved safety restraint system for a motor vehicle comprising:

first wave generator means, located proximate one corner of the motor vehicle for generating and propagating an electromagnetic first wave of predetermined frequency, wavelength, spectrum, duration and power to provide a desired sensing range and for receiving a first reflected wave reflected off of an obstacle within the range of the first wave generator means, the predetermined frequency of the first wave being in a radar frequency range;

second wave generator means, located proximate another corner of the motor vehicle for generating and propagating an electromagnetic second wave of predetermined frequency, wavelength, spectrum, duration and power to provide a desired sensing range and for receiving a second reflected wave reflected off of the obstacle with the range of the second wave generator means, the predetermined frequency of the second wave being in a radar frequency range;

collision means for predicting the time and location of impact of an obstacle with the motor vehicle, including determining that the obstacle is simultaneously within the range of the first and the second wave generator means and by triangularly tracking a trajectory associated with the obstacle, the collision means generating an output signal indicative thereof; and safety restraint means, actuated within the vehicle in response to the output signal of the collision means, for protecting an occupant within the vehicle during a crash.

2. The device as defined in claim 1 further including:

an auxiliary sensing means, having a predetermining auxiliary sensing range, and actuated when the obstacle is within such auxiliary sensing range and capable of discriminating between animate and inanimate obstacles and for generating an auxiliary activation signal to activate protective devices located about the exterior of the vehicle.

3. The system as defined in claim 2 wherein the auxiliary sensing means comprises one of an ultrasonic wavelength generator or receiver, an infra-red wavelength generator or receiver, and an optical imaging and recognition sensing systems each of which are capable of discriminating between animate and inanimate objects or obstacles.

4. The system as defined in claim 1 wherein each the first and second wave generator means produces a wave characterized by a beam coverage angle of at least 270 degrees.

5. The system as defined in claim 4 including two additional wave generator means each located at other corners of the vehicle.

6. The system as defined in claim 5 wherein each of additional wave generator means produces a wave characterized by a beam coverage angle of at least 270 degrees to provide an effective 360 degree beam coverage angle about the entire vehicle in concert with the beam coverage angles of the first and second wave generator means.

7. The device as defined in claim 1 wherein the collision means includes first means responsive to the first reflected wave, originating from the first generator means, for determining a first distance from the obstacle to the first wave generator means and responsive to a second reflected wave, originating from the second wave generator means, for determining a second distance from the obstacle to the second wave generator means and for determining a triangulated distance between the obstacle and the vehicle by triangulation using the first and second distances and a separation distance between the first and second wave generator means.

8. The device as defined in claim 7 wherein the collision means includes storage means for storing at subsequent calculation intervals, the triangulated distance between the obstacle and the vehicle and for predicting the location on the vehicle where the obstacle will impact the vehicle.

9. An improved safety restraint system for a motor vehicle comprising:

first radiation wave generator, located proximate one corner of the motor vehicle for generating and propagating an electromagnetic first wave of predetermined frequency, wavelength, spectrum, duration and power, and for receiving a first reflected wave reflected off of an obstacle within the range of the first radiation wave generator;

second radiation wave generator, located proximate another corner of the motor vehicle for generating and propagating an electromagnetic second wave of predetermined frequency, wavelength, spectrum, duration and power, and for receiving a second reflected wave reflected off of an obstacle within the range of the second radiation wave generator; and collision means for predicting the location and time of impact of a target with the vehicle based on said first and second reflected waves.

10. The improved safety restraint system of claim 9, wherein said collision means includes means for determining distance to the target and trajectory of the target through multiple determinations of position and trajectory over time.

11. The improved safety restraint system of claim 9, wherein said safety restraint system is one of a driver air bag, passenger air bag, side impact air bag, and pretensioning seat belt.

12. The improved safety restraint system of claim 9, wherein the collision means further comprises a central processing unit (CPU) for tracking the distance to the target by triangulating the position of the target from the first and second wave generators at different points in time.

13. The improved safety restraint system of claim 9, further comprising an auxiliary sensing means capable of discriminating between animate and inanimate targets and for generating an auxiliary activation signal to activate different safety measures based on the predicted attributes of the target.

14. The improved safety restraint system of claim 9, further comprising an auxiliary sensing means capable of identifying obstacles and for generating an auxiliary activation signal to activate different safety measures based on the identification of the target and the predicted attributes of the target.

* * * * *